United States Patent Office

3,432,474
Patented Mar. 11, 1969

3,432,474
PROCESS FOR FORMING NON-FOAMED POLYURETHANE ELASTOMERS USING METAL DIORGANO DITHIOCARBAMATES AS LATENT CURING CATALYSTS
Frank G. Lombardi, South Charleston, W. Va., assignor to Union Carbide Corporation, a corporation of New York
No Drawing. Filed Aug. 19, 1965, Ser. No. 481,106
U.S. Cl. 260—77.5
Int. Cl. C08g 22/04
6 Claims

ABSTRACT OF THE DISCLOSURE

Polyurethane elastomers are produced by reacting a prepolymer with a reactive curing agent in the presence of a latent curing catalyst comprising a metal diorganodithiocarbamate. The elastomers are useful as gaskets, backing for carpeting and other cast and molded articles.

---

The invention relates to a class of catalysts for urethane elastomers. In a particular aspect, the invention relates to a process for accelerating the cure of liquid urethane elastomer reaction mixtures. In a more particular aspect, the invention relates to the use of certain metal diorganodithiocarbamates as catalysts for accelerating the cure of liquid urethane elastomer reaction mixtures.

Urethane elastomers are a widely useful class of compositions. They are employed to produce sealers, films, gaskets and many other types of products. Urethane elastomeric products are ordinarily produced by molding or by casting. However, it has not heretofore been practicable to form urethane elastomeric products by knife coating, rotational casting, or by other techniques that require the application of a liquid reaction mixture that must cure to a solid in a relatively short time, i.e., in a few minutes. This is because the known liquid systems that are reactive enough to cure to a solid in a few minutes cannot be handled in an economically practicable manner. In other words, such liquid systems are 'too hot to handle" in commercial production.

The present invention is based upon the discovery that certain metal diorganodithiocarbamates can be employed as latent catalysts in liquid urethane elastomer systems, and that such systems are relatively unreactive until they are heated to a temperature greater than the activation temperature of the catalyst. By employing the invention, liquid urethane elastomer systems can be cast or otherwise applied and can then be heated above the activation temperature of the catalyst so that the liquid mixture will then cure to a solid in a few minutes. The invention makes it practicable to produce urethane elastomeric products by the use of knife coating, rotational casting, and other methods wherein the elastomer is applied as a liquid and is then cured to a solid in a few minutes. The invention provides a process which comprises the steps of (a) forming a liquid mixture of a polyisocyanate, a curing agent, and a catalytic quantity of metal diorganodithiocarbamate at a temperature below the activation temperature of said metal diorganodithiocarbamate, and (b) heating said liquid mixture to a temeprature at or above the activation temperature of said metal diorganodithiocarbamate for a period of time sufficient to cure said liquid mixture to a solid.

In carrying out the process of the invention, an organic polyisocyanate is employed. The polyisocyanate is normally an isocyanato-terminated polyurethane (usually called a "prepolymer") formed by reacting a stoichiometric excess of an organic polyisocyanate with a polyol.

Among the organic polyisocyanates that can be employed for this purpose are 2,4-tolylene diisocyanate, 2,6-tolylene diisocyanate and mixtures thereof, bis(4-isocyanatophenyl)methane and other bis(isocyanatophenyl) alkanes, dianisidine diisocyanate, bitolylene diisocyanate, xylylene diisocyanates, bis(2-isocyanatoethyl) fumarate, bis(2-isocyanatoethyl) carbonate, naphthalene diisocyanate, hexamethylene diisocyanate, and other organic polyisocyanates that are known in the art. For example, many organic polyisocyanates are disclosed in an article by Siefken, Ann., 562, 75 (1949). The diisocyanates are preferred. The aromatic diisocyanates are more preferred, and the tolylene diisocyanates are most preferred.

A wide variety of polyols can be employed to produce the prepolymer. The preferred polyols are diols or mixtures of diols with triols or higher polyols. One preferred class of polyols are the polyoxyalkylene glycols including polytetramethylene glycol and alkylene oxide adducts of various difunctional starters. Illustrative examples include ethylene oxide, 1,2-epoxypropane, 1,2-epoxybutane, 2,3-epoxybutane, or isobutylene oxide adducts of water, ethylene glycol, diethylene glycol, propylene glycol, dipropylene glycol, butylene glycol, ethylamine, aniline, and the like. The polytetramethylene glycols and the polyoxypropylene glycols are the preferred polyoxyalkylene glycols.

Another useful class of polyols includes the polyesters produced by reacting an excess of a polyhydric alcohol with a polycarboxylic acid. Illustrative of such polyesters are the diols and triols that are produced from adipic acid, phthalic acid, terephthalic acid, cyclohexanedicarboxylic acid, or the like, and ethylene glycol, propylene glycol, 1,1,1 - trimethylolpropane, glycerol, butylene glycol, or the like.

A further useful class of polyols are the polylactone diols prepared by reacting a lactone with a bifunctional initiator (as disclosed in U.S. Patent No. 3,169,945) or by reacting a mixture of a lactone and an alkylene oxide with a bifunctional initiator (as disclosed in U.S. Patent 2,962,524). Polylactone diols prepared by reacting epsilon-caprolactone or methylepsilon-caprolactone with a diol or with a diamine such as ethylene glycol, diethylene glycol, propylene glycol, dipropylene glycol, bis(4-aminophenyl)methane, ethylenediamine, or the like, are preferred.

In addition to the diols exemplified above, polyols of higher functionality can be employed, usually in minor amounts in admixture with one or more diols, to produce the isocyanato-terminated prepolymer. Included among such polyols are alkylene oxide adducts of glycerol, pentaerythritol, sorbitol, sucrose, and the like, trialkanolamines such as triisopropanolamine, triethanolamine, and the like, and other materials that are well known in the art.

The polyol or polyol mixture that is employed to produce isocyanato-terminated prepolymers normally has a hydroxyl number within the range of from about 30 to about 350, and preferably from about 50 to about 250.

The prepolymer is prepared by reacting a stoichiometric excess of the organic polyisocyanate with the polyol according to known procedures. Usually, the organic polyisocyanate is employed in proportions of from about 30 percent to about 200 percent stoichiometric excess, the stoichiometry being based upon equivalents of isocyanate per equivalent of hydroxyl in the polyol.

In many cases, the elastomer can be prepared by a "one-shot" technique. That is, the polyol and polyisocyanate need not be pre-reacted to form a prepolymer. In such cases, the polyol, polyisocyanate, and curing agent are reacted together in one step.

A curing agent for the polyisocyanate is also employed in the invention. The curing agent can be one or more of many compositions such as bis(4-aminophenyl)methane, methylene-bis(orthochloroaniline), ethylenediamine, diethanolamine, diisopropanolamine, triisopropanolamine, ethylene glycol, diethylene glycol, and the like. The curing agent is normally employed with the prepolymer in proportions of from about 50 percent to about 90 percent of the stoichiometric amount, with the stoichiometry being based upon equivalents of reactive hydrogen in the curing agent per equivalent of isocyanate in the prepolymer. In calculating the stoichiometry, the word "prepolymer" means either the pre-reacted composition formed by reacting polyol with excess of polyisocyanate, or the mixture of polyol and polyisocyanate when the one-shot technique is employed.

The latent catalysts that are employed in the invention are the metal diorganodithiocarbamates wherein the organo groups can be, for instance, alkyl groups of up to 18 carbon atoms and preferably from 1 to 8 carbon atoms. Specific illustrative metal diorganodithiocarbamates include the zinc dialkyldithiocarbamates such as zinc dimethyldithiocarbamate, zinc diethyldithiocarbamate, zinc dipropyldithiocarbamate, zinc dibutyldithiocarbamate, zinc dipentyldithiocarbamate, zinc pentamethylenedithiocarbamate, zinc dihexyldithiocarbamate, zinc dioctyldithiocarbamate, zinc didecyldithiocarbamate, zinc didodecyldithiocarbamate, zinc ditetradecyldithiocarbamate, zinc dioctadecyldithiocarbamate, and the like. Also useful are the zinc dialkyldithiocarbamates wherein the alkyl groups contain substituent groups, such as zinc dibenzyldithiocarbamate. Additional useful latent catalysts include lead dimethyldithiocarbamate, lead diamyldithiocarbamate, cobalt diethyldithiocarbamate, ferric diethyldithiocarbamate, ferrous diethyldithiocarbamate, lead (phenyl aminoethyl) phenyl-dithiocarbamate, stannous diethyldithiocarbamate, stannic diethyldithiocarbamate, chromium diethyldithiocarbamate, and the like. Zinc dimethyldithiocarbamate and zinc dibutyldithiocarbamate are the preferred latent catalysts. The latent catalyst is employed in catalytic quantities, for instance, from about 0.2 weight percent to about 5 weight percent, based upon weight of reactants.

The process of the invention is carried out by first making a mixture of the prepolymer (or the mixture of polyol plus isocyanate), curing agent, and latent catalyst. The components, along with any filler, pigment, or the like, are mixed in any desired order and are then usually heated under a vacuum in order to de-gas the mixture. The temperature at which the mixture is de-gassed is preferably below the activation temperature of the latent catalyst. For instance, a convenient de-gassing temperature is found within the range of from about 80° C. to about 100° C. After de-gassing, the liquid mixture is then formed into the desired shape by casting, knife coating, or other convenient means, at a temperature below the activation temperature of the latent catalyst. After forming, the mixture is heated to a temperature at or above the activation temperature of the latent catalyst for a period of time sufficient to cure the mixture to a solid elastomer. The activation temperature varies slightly depending upon which metal diorganodithiocarbamate is employed as the latent catalyst, but is normally about 125° C. The time required for the liquid mixture to cure to a solid will vary somewhat depending upon the temperature and the nature and proportion of reactants and catalysts, but will normally be within the range of from about 1 minute to about 15 minutes at temperatures within the range of from about 125° C. to about 150° C. After the elastomer has cured to a solid, a post-cure is often desirable. Post-cures at temperatures of from about 80° C. to about 140° C. for from about one-half hour to about 24 hours are useful.

The process of the invention is useful for producing many elastomeric articles. For instance, the process of the invention can be employed to produce basketballs, footballs, and other items by rotational casting. The process of the invention can be employed to produce continuous strips of elastomeric material useful as gasketing, and the like, by knife coating onto a non-adhering substrate. The process can also be employed to produce backing for carpeting, upholstery, and the like, by knife coating. The process of the invention can, of course, be employed to produce urethane elastomeric articles by the heretofore conventional casting and molding techniques. The advantage of the invention resides in the fact that, for the first time, it is possible to produce urethane elastomeric articles by knife coating, rotational casting, and other techniques wherein the article is formed in the liquid state and is then cured to a solid in a very short time.

The examples which follow illustrate various aspects of the invention.

Example 1

A mixture of the following reactants was made:

| | Parts by weight |
|---|---|
| Polypropylene glycol (M.W.=2000) | 50 |
| Triisopropanolamine | 4 |
| Prepolymer A [1] | 15 |

[1] Produced by reacting 4 parts by weight of tolylene diisocyanate with 1 part by weight of dipropylene glycol.

The above mixture was heated to 135° C. for 15 minutes, after which time it was still a liquid. However, when 0.5 part by weight of zinc dibutyldithiocarbamate was added to the mixture, it cured to a non-tacky solid elastomer in 2 minutes at 135° C.

Example 2

A mixture of the following reactants was made:

| | Parts by weight |
|---|---|
| Polyol A [1] | 100 |
| Prepolymer B [2] | 31.45 |
| Colloidal silica filler ("Cab-o-sil" M-5) | 0.4 |

[1] Polyol A is a mixture of polypropylene glycol having a molecular weight of 1200 and triisopropanolamine, the mixture having a hydroxyl number of 121.
[2] Prepolymer B is formed by reacting tolylene diisocyanate with the propylene oxide adduct of sorbitol having a hydroxyl number of 490. The prepolymer had a free isocyanate content of 30%.

The table below displays the effect of heating the above mixture to 100° C. and to 135° C. both without catalyst and with 1 part by weight of either zinc dimethyldithiocarbamate or zinc dibutyldithiocarbamate.

EFFECTS AT 100° C.

| | Results |
|---|---|
| No catalyst | Increase in viscosity after 2 hours; still tacky after 14 hours. |
| Zinc dimethyl-dithiocarbamate | Elastomer set hard after 45 minutes. |
| Zinc dibutyl-dithiocarbamate | Began to set up after 50 minutes. Set hard after 60 minutes. |

EFFECTS AT 135° C.

| | Results |
|---|---|
| No catalyst | Liquid after 30 minutes. |
| Zinc dimethyl-dithiocarbamate | Solid after 10 minutes and set up hard after 15 minutes. |
| Zinc dibutyl-dithiocarbamate | Solid but tacky after 10 minutes and set up hard after 15 minutes. |

Example 3

A mixture of the following reactants were made:

| | Parts by weight |
|---|---|
| Polyol A | 100 |
| Prepolymer B | 32.08 |
| Silica filler ("Cab-o-sil" M-5) | 0.4 |

To portions of this mixture there was added 1 part by weight of each of the catalysts listed in the table below. The catalytic effects at room temperature (about 23° C.), at 100° C., and at 135° C. were determined. In the table, the meaning of the letters in parentheses is as follows: (a) liquid, (b) increase in viscosity, (c) cured, tacky surface, (d) cured, hard surface.

(In the table, the indicated times are in minutes unless stated otherwise.)

CATALYTIC EFFECTS

| Catalyst | Effects after various times at— | | |
|---|---|---|---|
| | Room temperature | 100° C. | 135° C. |
| Stannic diethyldithiocarbamate | (a) 1 hr | (a) 25 (b) 30 (d) 45 | (a) 10 (c) 12 (d) 14 |
| Chromium dithyldithiocarbamate | (a) 1 hr | (a) 15 (b) 20 (d) 45 | (a) 5 (c) 8 (d) 14 |
| Ferric diethyldithiocarbamate | (a) 1 hr | (a) 15 (b) 25 (c) 40 | (a) 5 (c) 8 (d) 14 |
| Cobalt diethyldithiocarbamate | (a) 1 hr | (a) 20 )b) 30 (c) 45 | (a) 5 (c) 8 (d) 12 |
| Ferrous diethyldithiocarbamate | (a) 1 hr | (b) 5 (d) 9 | (b) 4 (d) 5 |
| Stannous diethyldithiocarbamate | (a) 1 hr | (a) 5 (b) 15 (d) 25 | (a) 4 (b) 5 (d) 8 |
| Zinc dibenzyldithiocarbamate | (a) 1 hr | (a) 25 (b) 45 | (a) 5 (c) 10 |
| Lead dimethyldithiocarbamate | (a) 1 hr | (a) 45 | (a) 5 (c) 10 |
| Zinc pentamethylenedithiocarbamate. | (a) 1 hr | (a) 25 (c) 40 | (a) 9 (c) 10 [1] |
| Lead (phenyl aminoethyl)-phenyldimethyldithiocarbamate. | (a) 1 hr | (a) 15 (b) 30 (c) 45 | (d) 5 |

[1] At 130° C.

One advantageous property of many of the latent catalysts of the invention is that elastomers can be handled at elevated temperatures (e.g., 100° C.) in a liquid state for a reasonable length of time, and can then be heated to a temperature above the activation temperature of the latent catalyst to achieve cure in a few minutes.

What is claimed is:

1. Process which comprises the steps of (a) forming a liquid mixture of (1) an isocyanato-terminated polyurethane produced by reacting an excess of an organic polyisocyanate with a polyol having up to 8 hydroxyl groups, (2) a curing compound having from two to three groups reactive with isocyanate, said groups being selected from the class consisting of amino groups and aliphatic alcoholic hydroxyl groups, and (3) a catalytic quantity of a metal diorganodithiocarbamate, said metal being selected from the group consisting of zinc, cobalt, lead, iron, tin and chromium, and wherein the said organo group has up to 18 carbon atoms and is selected from the class consisting of alkyl, benzyl, phenyl, and aminoethyl, (4) at a temperature below the activation temperature of said metal diorganodithiocarbamate and (b) heating said liquid mixture to a temperature at or above the activation temperature of said metal diorganodithiocarbamate for a period of time sufficient to cause said liquid mixture to solidify, wherein said liquid mixture is free of foaming agents.

2. Process of claim 1 wherein the metal diorganodithiocarbamate is a zinc dialkyldithiocarbamate.

3. Process of claim 2 wherein said zinc dialkyldithiocarbamate is zinc dimethyldithiocarbamate.

4. Process of claim 2 wherein said zinc dialkyldithiocarbamate is zinc dibutyldithiocarbamate.

5. Process of claim 1 wherein said activation temperature is about 125° C.

6. Process of claim 1 wherein the metal diorganodithiocarbamate is a compound selected from the group consisting of stannic diethyldithiocarbamate, chromium diethyldithiocarbamate, ferric diethyldithiocarbamate, cobalt diethyldithiocarbamate, ferrous diethyldithiocarbamate, stannous diethyldithiocarbamate, zinc dibenzyldithiocarbamate, lead dimethyldithiocarbamate, zinc pentamethylenedithiocarbamate, and lead (phenyl aminoethyl) phenyldimethyldithiocarbamate.

References Cited

UNITED STATES PATENTS 2,814,604   11/1957   Nichols et al. _____ 260—40
3,245,923   4/1966   Manzella et al. _____ 260—2.5
3,255,129   6/1966   Ferrari _____ 260—2.5

FOREIGN PATENTS 655,550   1/1963   Canada.

OTHER REFERENCES

Britain et al.: Journal of Applied Polymer Science, vol. IV, pp. 207–211 (1960).

DONALD E. CZAJA, Primary Examiner.

H. S. COCKERAN, Assistant Examiner.

U.S. Cl. X.R.

260—2.5, 75